United States Patent
Park et al.

(10) Patent No.: US 9,451,460 B2
(45) Date of Patent: Sep. 20, 2016

(54) METHOD AND APPARATUS FOR ASSOCIATING STATION (STA) WITH ACCESS POINT (AP)

(71) Applicant: LG ELECTRONICS INC., Seoul (KR)

(72) Inventors: Giwon Park, Anyang-si (KR); Jinsam Kwak, Anyang-si (KR); Kiseon Ryu, Anyang-si (KR); Jaehyung Song, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/374,844

(22) PCT Filed: Feb. 7, 2013

(86) PCT No.: PCT/KR2013/000966
§ 371 (c)(1),
(2) Date: Jul. 25, 2014

(87) PCT Pub. No.: WO2013/119043
PCT Pub. Date: Aug. 15, 2013

(65) Prior Publication Data
US 2015/0040195 A1 Feb. 5, 2015

Related U.S. Application Data

(60) Provisional application No. 61/596,122, filed on Feb. 7, 2012, provisional application No. 61/596,177, filed on Feb. 7, 2012, provisional application No. 61/597,841, filed on Feb. 13, 2012.

(51) Int. Cl.
*H04L 29/06* (2006.01)
*H04W 12/06* (2009.01)
(Continued)

(52) U.S. Cl.
CPC ............. *H04W 12/06* (2013.01); *H04W 12/08* (2013.01); *H04W 84/12* (2013.01)

(58) Field of Classification Search
None
See application file for complete search history.

(56) References Cited

U.S. PATENT DOCUMENTS 7,103,359 B1 * 9/2006 Heinonen ............. H04W 12/02
370/331
7,107,051 B1 * 9/2006 Walker .................... H04L 9/083
380/247

(Continued)

FOREIGN PATENT DOCUMENTS

KR 10-2006-0126890 12/2006
KR 10-2010-0065671 6/2010
KR 10-2010-0077382 7/2010

OTHER PUBLICATIONS

PCT International Application No. PCT/KR2013/000966, Written Opinion of the International Searching Authority dated May 29, 2013, 1 page.

*Primary Examiner* — Christopher Revak
(74) *Attorney, Agent, or Firm* — Lee, Hong, Degerman, Kang & Walmey; Jonathan Kang; Michael Monaco

(57) ABSTRACT

The present invention relates to a method and apparatus for associating a station (STA) with an access point (AP). The method for associating a first AP with an STA in a wireless LAN includes the steps of: a first AP receiving an association request frame from the STA; the first AP requesting authentication information on the STA from a second AP with which the STA was previously associated; the first AP receiving authentication information on the STA from the second AP, wherein the first and second AP's are linked by a distribution system, the association request frame includes identification information on the second AP, and the authentication information on the STA can include at least one of a paired main key (PMK) and a recertification main session key (rMSK). Accordingly, fast association between the STA and the AP can be achieved by a simplified authentication procedure without repeating a full authentication procedure.

4 Claims, 10 Drawing Sheets

(51) Int. Cl.
*H04W 12/08* (2009.01)
*H04W 84/12* (2009.01)

(56) References Cited

U.S. PATENT DOCUMENTS

| | | | |
|---|---|---|---|
| 2004/0077335 A1* | 4/2004 | Lee | H04L 63/08 455/410 |
| 2004/0098586 A1* | 5/2004 | Rebo | H04L 63/0869 713/169 |
| 2006/0083200 A1* | 4/2006 | Emeott | H04L 9/083 370/331 |
| 2007/0060127 A1* | 3/2007 | Forsberg | H04L 63/061 455/436 |
| 2007/0121947 A1* | 5/2007 | Sood | H04L 9/0836 380/277 |
| 2008/0165735 A1* | 7/2008 | Chen | H04W 76/041 370/331 |
| 2008/0267407 A1* | 10/2008 | Vanderveen | H04L 9/083 380/277 |
| 2009/0286534 A1* | 11/2009 | Garg | H04W 36/10 455/432.1 |
| 2010/0138661 A1* | 6/2010 | Tsai | H04L 9/0844 713/171 |
| 2010/0241854 A1* | 9/2010 | Yao | H04L 63/061 713/168 |
| 2011/0002465 A1* | 1/2011 | Ahn | H04L 63/08 380/272 |
| 2013/0243194 A1* | 9/2013 | Hawkes | H04L 63/067 380/270 |
| 2013/0263223 A1* | 10/2013 | Cherian | H04L 9/0869 726/4 |

* cited by examiner (A)

(B)

METHOD AND APPARATUS FOR ASSOCIATING STATION (STA) WITH ACCESS POINT (AP)

CROSS-REFERENCE TO RELATED APPLICATIONS

This application is the National Stage filing under 35 U.S.C. 371 of International Application No. PCT/KR2013/000966, filed on Feb. 7, 2013, which claims the benefit of U.S. Provisional Application Ser. Nos. 61/596,122, filed on Feb. 7, 2012, 61/596,177, filed on Feb. 7, 2012 and 61/597,841, filed on Feb. 13, 2012, the contents of which are all hereby incorporated by reference herein in their entirety.

BACKGROUND OF THE INVENTION

1. Field of the Invention

The present invention relates to a method and apparatus for associating a station (STA) with an Access Point (AP) and, more particularly, to an authentication procedure between an STA and an AP.

2. Related Art

A recent Wireless LAN (WLAN) technology is basically evolving in three directions. There are Institute of Electrical and Electronic Engineers (IEEE) 802.11ac and IEEE 802.11ad as efforts to further increase the transfer rate on the extension line of an existing WLAN evolution direction. IEEE 802.11ad is a WLAN technology using a 60 GHz band. Furthermore, a wide area WLAN that utilizes a frequency band of less than 1 GHz in order to enable wider area transfer than that of the existing WLAN in distance is recently emerging. The wide-area WLAN includes IEEE 802.11af using a TV White Space (TVWS) band and IEEE 802.11ah using a 900 MHz band. A main object of the wide-area WLAN is to extend extended range Wi-Fi service as well as a smart grid and a wide area sensor network. Furthermore, an existing WLAN Medium Access Control (MAC) technology is problematic in that an initial link setup time is very long according to circumstances. In order to solve such a problem and in order for an STA to rapidly access an AP, IEEE 802.11ai standardization activities are recently carried out actively.

IEEE 802.11ai is a MAC technology for handling a fast authentication procedure in order to significantly reduce the initial setup and association time of a WLAN, and standardization activities for IEEE 802.11 ai have been started as a formal task group on January, 2011. In order to enable a fast access procedure, in IEEE 802.11ai, a discussion on the simplification of the procedure in fields, such as AP discovery, network discovery, Time Synchronization Function (TSF) synchronization, authentication & association, and a procedure convergence with a higher layer, is in progress. From among them, ideas, such as procedure convergence using the piggyback of a Dynamic Host Configuration Protocol (DHCP), the optimization of a full Extensible Authentication Protocol (EAP) using a concurrent IP, and efficient and selective Access Point (AP) scanning, are being actively discussed.

SUMMARY OF THE INVENTION

An object of the present invention is to provide an association method between a station (STA) and an Access Point (AP).

Another object of the present invention is to provide an apparatus for performing an association method between an STA and an AP.

A method of performing, by a first Access Point (AP), an association with a station (STA) in a WLAN according to an aspect of the present invention for achieving the objects of the present invention includes receiving an association request frame from the STA, requesting the authentication information of the STA from a second AP with which the STA was previously associated, and receiving the authentication information of the STA from the second AP. The first AP and the second AP may be connected by a distribution system, the association request frame may include information on the identifier of the second AP, and the authentication information of the STA may include at least one of a Paired Main Key (PMK) and a recertification Main Session Key (rMSK). The association request frame may further include information on the identifier of the STA, an Extensible Authentication Protocol transport Over Local area network (EAPOL)-key, and Message Integrity Code (MIC), the information on the identifier of the STA may be information on the Association IDentification (AID) of the STA, the EAPOL-key may be an authentication key generated based on an ANonce received from the first AP and an SNonce generated by the STA, and the MIC may be a code for an integrity authentication of a message. The association method between the AP and the STA in the WLAN may further comprise generating a security key based on the ANonce and the SNonce and performing an authentication for the STA by performing verification on the MIC based on the security key. The association method between the AP and the STA in the WLAN may further comprises ending an association response frame encrypted by the security key to the STA when the first AP succeeds in the authentication for the STA, not sending the association response frame to the STA or sending the association response frame to the STA the association response frame including information that requests the STA to perform a full authentication procedure when the first AP fails in the authentication for the STA. The STA may receive a beacon frame or a probe response frame transmitted by the second AP, and wherein the beacon frame or the probe response frame may include information on whether or not the second AP and the first AP share the authentication information. The association method between the AP and the STA in the WLAN may further comprise determining whether or not the STA is an STA with which the first AP was previously associated based on an identification of the STA included in the association request frame, and performing authentication on the STA based on the authentication information retained in the first AP when the STA was previously associated with the AP, wherein the authentication information may be information retained during a specific time and deleted when the specific time expires.

A first access point (AP) as a wireless local area network (WLAN) apparatus according to another aspect of the present invention for achieving the objects of the present invention includes a processor. The processor may be configured to receive an association request frame from an STA, request authentication information of the STA from a second AP with which the STA was previously associated, and receive the authentication information of the STA from the second AP. The first AP and the second AP may be connected by a distribution system, the association request frame may include information on an identifier of the second AP, and the authentication information of the STA may include at least one of a Paired Main Key (PMK) and a recertification Main Session Key (rMSK). The association request frame may further include information on the identifier of the STA, an Extensible Authentication Protocol transport Over Local area network (EAPOL)-key, and Message Integrity Code (MIC), the information on the identifier of the STA may be information about the Association IDentification (AID) of the STA, the EAPOL-key may be an authentication key generated based on an ANonce received from the first AP and an SNonce generated by the STA, and the MIC may be code for an integrity authentication of a message. The processor may be configured to generate a security key based on the ANonce and the SNonce and to perform an authentication for the STA by performing verification on the MIC based on the security key. The processor may be configured to send an association response frame, encrypted by the security key, to the STA when the authentication of the STA is successful and to not send the association response frame to the STA or send the association response frame to the STA the association response frame including information that requests the STA to perform a full authentication procedure when the authentication of the STA fails. The processor may be configured to generate a beacon frame or a probe response frame including information on whether or not the authentication information is shared with the second AP. The processor may be configured to determine whether or not the STA is a previously associated STA based on the identifier of the STA included in the association request frame and perform authentication on the STA based on the authentication information retained in the first AP when the STA is the previously associated STA. The authentication information may be information retained during a specific time and deleted when the specific time expires.

A fast association can be performed between a station (STA) and an Access Point (AP) because a simplified authentication procedure is performed without performing a full authentication procedure again.

DESCRIPTION OF EXEMPLARY EMBODIMENTS

Figure 1:
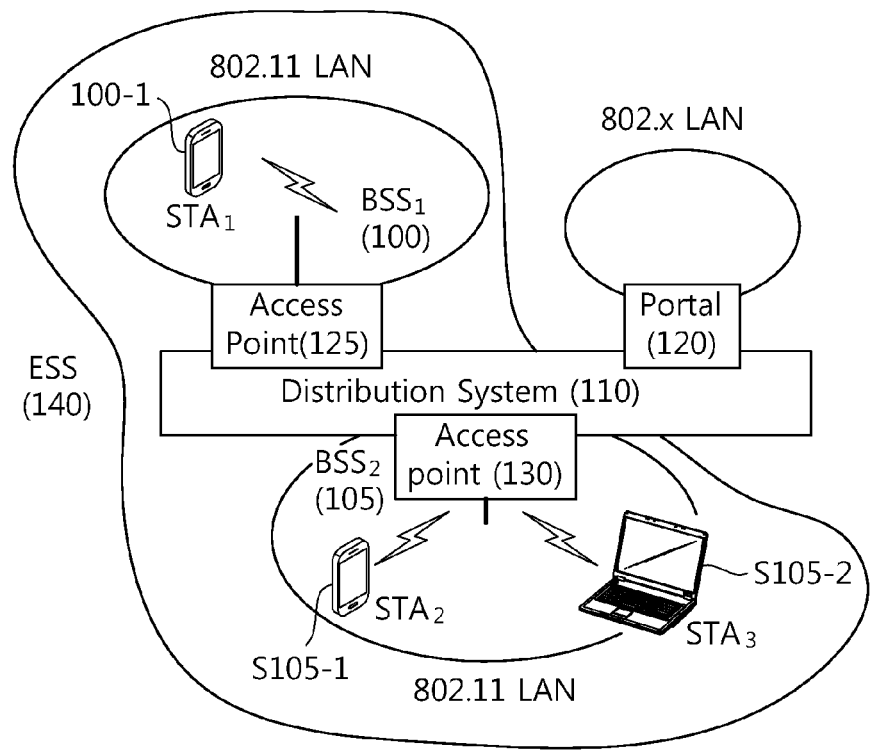
FIG. 1 is a conceptual diagram illustrating the configuration of a Wireless Local Area Network (WLAN).
Figure 1:
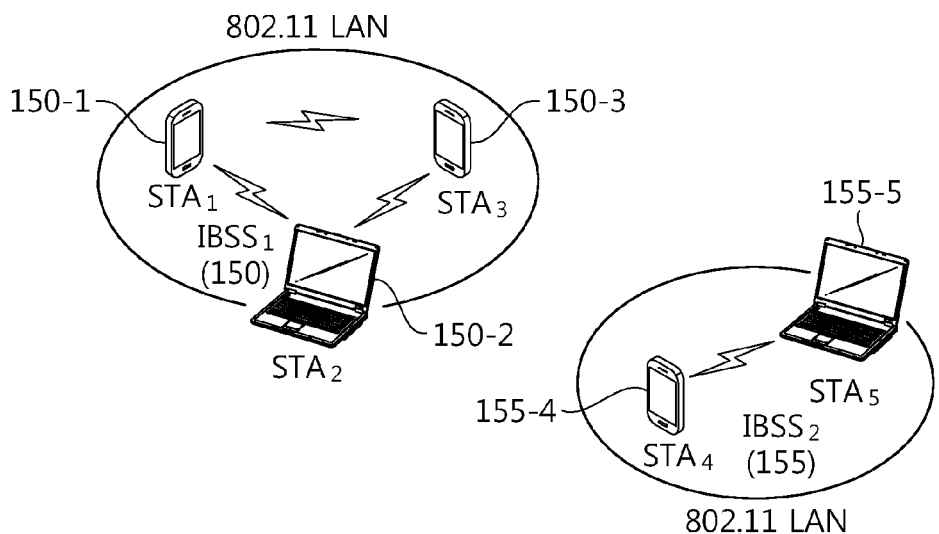

FIG. 1 is a conceptual diagram illustrating the configuration of a Wireless Local Area Network (WLAN).

FIG. 1(A) illustrates the configuration of an infrastructure network according to the Institute of Electrical and Electronic Engineers (IEEE) 802.11.

Referring to FIG. 1(A), the WLAN system may include one or more Basic Service Sets (BSSs) 100 and 105. Each of the BSSs 100 and 105 is a set of an AP and an STA, such as an Access Point (AP) 125 and a Station STA1 100-1 that are successfully synchronized with each other and are capable of communicating with each other. The BSS is not a concept indicative of a specific area. The BSS 105 may include one or more STAs 105-1 and 105-2 that may be associated with one AP 130.

An infrastructure BSS may include at least one STA, the APs 125 and 130 that provide distribution service, and a Distribution System (DS) 110 that couples a plurality of the APs.

The distribution system 110 may implement an Extended Service Set (ESS) 140 by coupling some BSSs 100 and 105. The ESS 140 may be used as a term indicative of one network over which one or more APs 125 and 230 are connected through the distribution system 110. APs included in one ESS 140 may have the same Service Set IDentification (SSID).

A portal 120 may function as a bridge for performing a connection between a WLAN network (IEEE 802.11) and another network (e.g., 802.X).

In an infrastructure network, such as that of FIG. 1(A), a network between the APs 125 and 130 and a network between the APs 125 and 130 and the STAs 100-1, 105-1, and 105-2 may be implemented. However, a network may be configured between STAs so that they are capable of performing communication even without the APs 125 and 130. A network configured between STAs without the APs 125 and 130 so that the STAs are capable of performing communication is defined as an Ad-Hoc network or an independent Basic Service Set (BSS).

FIG. 1(B) is a conceptual diagram illustrating an independent BSS.

Referring to FIG. 1(B), the Independent BSS (IBSS) is a BSS that operates in Ad-Hoc mode. The IBSS does not include a centralized management entity because it does not include an AP. That is, in the IBSS, STAs 150-1, 150-2, 150-3, 155-4, and 155-5 are managed in a distributed manner. In the IBSS, all the STAs 150-1, 150-2, 150-3, 155-4, and 155-5 may be mobile STAs, and they form a self-contained network because they are not allowed to access a distribution system.

An STA is a specific function medium, including Medium Access Control (MAC) that complies with the rules of the IEEE 802.11 standard and a physical layer interface for a radio medium. In a broad sense, an STA may be used as a meaning that includes both an AP STA and a non-AP STA.

An STA may be called various names, such as a mobile terminal, a wireless device, a Wireless Transmit/Receive Unit (WTRU), User Equipment (UE), a Mobile Station (MS), a mobile subscriber unit, or simply a user.

Hereinafter, embodiments of the present invention disclose a method of performing, by an STA and an AP, an association by simplifying an authentication procedure between the AP and the STA. A simplified authentication method to be hereinafter disclosed in an embodiment of the present invention may be performed between an AP and an STA included in the same Extended Service Set (ESS). The ESS may be a set of infrastructure BSSs that are coupled by a distribution system and that have the same Service Set IDentification (SSID). That is, in the present invention, APs to be disclosed in the simplified authentication method may be devices that are connected by a distribution system and that have the same SSID.

Figure 2:
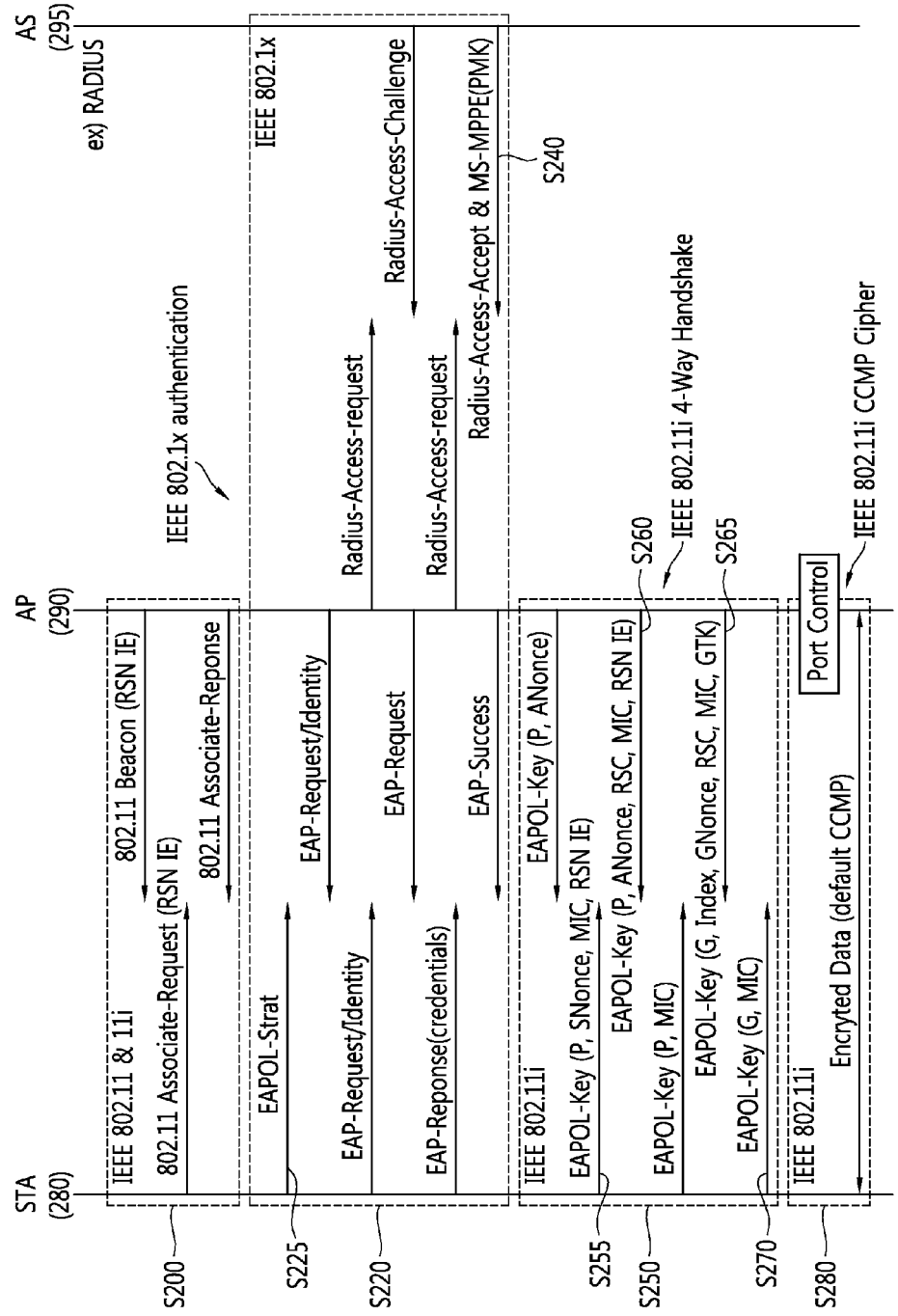
FIG. 2 is a flowchart illustrating a WLAN security access method defined in the existing 802.11i standard.

FIG. 2 is a flowchart illustrating a WLAN security access method defined in the existing 802.11i standard.

A standardization object of IEEE 802.11 TGi is to construct a Robust Security Network (RSN) through authentication, the exchange of keys, and the protection of wireless section data between an AP 290 and an STA 280 within a BSS covered by the single AP 290 in order to protect WLAN users. An IEEE 802.11i standard defines a user authentication method, a key exchange method, and an improved wireless section encryption algorithm in order to protect WLAN users, and defines IEEE802.1X authentication, the exchange of 4-way handshake keys, and a Counter mode with CBC-MAC Protocol (CCMP) encryption algorithm as essential implementation functions.

FIG. 2 discloses a WLAN security access method to which an IEEE 802.1x standard and an IEEE 802.11i standard are applied.

In order for a connection with an external network through an AP to be permitted after authentication and the exchange of keys are completed, IEEE 802.11 access (step S200), IEEE 802.1x authentication (step S220), IEEE 802.11i key exchange (step S250), and wireless section data encryption (step S280) need to be organically connected.

Step S220 of FIG. 2 is the authentication part of WLAN security access using IEEE 802.1X. In the IEEE 802.11i standard, two types of user authentication methods are defined. The first user authentication method is an IEEE 802.1X authentication method and is an essential implementation item. The second user authentication method is a Pre-Shared Key (PSK) method and is a selection item. The methods are collectively called an Authentication and Key Management (AKM) method because a key management method of generating the PMKs of session keys to be exchanged between the wireless STA 280 and the AP 290 is classified in addition to user authentication. The two methods are hereinafter sequentially disclosed.

(1) The IEEE 802.1X Authentication Method

The IEEE 802.1X authentication method is a standard that was written by an IEEE 802.1X task group and approved on June, 2001. The IEEE 802.1x authentication method defines an access control function that accommodates various authentication protocols for user authentication and that is based on an access port. A WLAN system may also perform WLAN user authentication through such port-based access control, and may transfer a Pairwise Master Key (PMK) necessary for wireless section security. In the WLAN system, the AP 290 functions as an access authenticator. In order to perform IEEE 802.1x authentication, an Authentication Server (AS) 295 having authentication information about the STA 280 that requests to access a network administrator region that manages the AP 290 needs to be present, or the AP needs to have the function of the AS 295 embedded therein.

Referring to FIG. 2, the lowest MS-MPPE (PMK) part (step S240) of step S220 is a procedure in which the AS 295 transfers a PMK to the AP 290. Pairwise Transient Keys (PTKs) are exchanged using the PMK, and port control is performed with reference to a result of the exchange.

(2) The Pre-Shared Key (PSK) Method

In the PSK method that is the second authentication method, the separate AS 295 is not required, and instead the wireless STA 280 and the AP 290 need to previously share a specific key. The PSK method is a method that may be used in a small office or home. In this method, a PMK is induced by applying a PSK to a predetermined Pseudo-Random Function (PRF). If the PSK method is used, the process of step S220 of FIG. 2 may be omitted. The subsequent procedures, such as the exchange of PTKs, port control, and data encryption communication, may be the same.

The session key exchange method of the IEEE 802.11i standard uses a 4-way handshake method. However, three types of session keys may be basically present depending on an object that uses a key, and a key exchange method for the three types of session keys may be subdivided as follows.

(1) A 4-way handshake method for the exchange of PTKs for unicast communication protection between the single wireless STA 280 and the AP A 4-way handshake for generating a dynamic key may be performed using an EAPOL-key descriptor (step S255, step S260). The EAPOL-key descriptor is also used in a group key handshake and an STA key handshake in addition to the 4-way handshake. The 4-way handshake of the IEEE 802.11i standard also provides a function capable of again checking or changing a security negotiation in the MAC layer in addition to the setup of a PTK.

The second message (S255) and third message (S260) of the 4-way handshake includes a Robust Security Network Information Element (RSN IE) in the key data field of the EAPOL-key descriptor. The RSN IE is a message that includes an authentication method between the wireless STA 280 and the AP 290 and negotiation information about an encryption algorithm, and the RSN IEs are exchanged and negotiated in a WLAN MAC association step. Such an RSN IE is included in the 4-way handshake message so that information about the RSN IE can be checked again and interpreted in a MAC higher layer.

(2) A group key handshake method for the exchange of group keys GTK that is used for the AP 290 to perform one-to-many (broadcast) communication with a plurality of the wireless STAs 280

The group key handshake method is described below. Lower two exchange procedures (step S265, S270) of six exchange procedures illustrated in step S250 indicated by "IEEE 802.11i 4-Way Handshake" of FIG. 2 are indicative of the group key handshake method.

In the case of a group key handshake, when the AP 290 generates a one-to-many group key, encrypts the one-to-many group key, loads the encrypted group key onto the key data field of the EAPOL-key descriptor, and sends the group key, the wireless STA 280 restores the encrypted group key using information about an EAPOL-key encryption key owned by the wireless STA 280.

(3) An STA key handshake method for the exchange of STA to STA keys used when two wireless STAs within the same BSS perform communication An object of an STA key handshake is a method for separately obtaining an encryption key to be used when wireless STAs within the same BSS exchange data. Since all the wireless STAs are connected to a network through only an AP in WLAN infrastructure mode, the AP has to decrypt data received from all the wireless STAs. Furthermore, if data to be transferred is present, the AP has to encrypt the data and to send the encrypted data to the wireless STAs. In the STA key handshake, wireless STAs within the same BSS set up an encryption key, and data encrypted using the encryption key is transferred from an AP to counterpart wireless STAs without change. Accordingly, there is an advantage in that a load of the AP that has to decrypt a password can be reduced.

The authentication and security procedure of the STA 280 disclosed in FIG. 2 is simply summarized as follows. The authentication of an Extended Authentication Protocol (EAP) is started when the AP 290 sends an EAP-Request or when the STA 280 sends an EAPOL-Start message (step S225). Through an EAP authentication frame, the AP 290 performs an interface function for generating a Robust Security Network Association (RSNA) authentication connection between the STA 280 and the AS 295 using the uncontrolled port of IEEE 802.1X.

The STA 280 and the AS 295 generates authentication and Pairwise Master Keys (PMKs) through EAP-Transport Layer Security (TLS) or EAP-Tunneled Transport Layer Security (TTLS). The PMKs are transferred to the AP 290 through security connection between the AP 290 and the AS 295. The AP 290 and the STA 280 that share the PMK perform 4-way key exchange protocols defined in IEEE 802.11i based on respective PMKs. In the 4-way handshake, a process of first checking the presence of a counterpart's PMK, a PTK is generated from the PMK if the PMKs are identical with each other, hierarchically managing the generated PTK, and transferring the PTK to an MAC protocol is performed.

After the PTK is successfully transferred, the AP 290 permits the controlled port of IEEE 802.1x so that a common data frame can be provided with IEEE 802.11 service.

A group key handshake process is performed when a change of a GTK is requested after data is exchanged based on a key generated through a 4-way handshake, and is performed for the security of a frame transmitted to a group address between the STA 280 and the AP 290. Like a PTK, a GTK generated as described above is hierarchically managed and then transferred to an MAC protocol for encryption and decryption.

When the authentication and security of an existing STA are performed, a full authentication procedure is performed and a security procedure different from the full EAP procedure is performed whenever an STA performs an association with an AP. That is, if an STA releases an association with an AP with which the STA is now associated and is associated with another AP or if the STA is associated with an AP with which the STA was previously associated, the time for authentication between the STA and the AP is lengthened because an authentication procedure is performed again from the beginning.

In the present invention, in order to solve such a problem, a method of performing a fast association between an STA and an AP by simplifying an authentication procedure between the STA and the AP is disclosed by dividing the method into (1) a case where an STA releases an association with an AP with which the STA is now associated and is associated with another AP and (2) a case where an STA is re-associated with an AP with which the STA was previously associated.

Hereinafter, in embodiments of the present invention, an expression "authentication procedure" is used, for convenience of description, but the meaning of the authentication procedure may include both procedures for performing authentication and security. That is, in a broad sense, authentication may be used as a meaning that includes both authentication and security.

Figure 3:
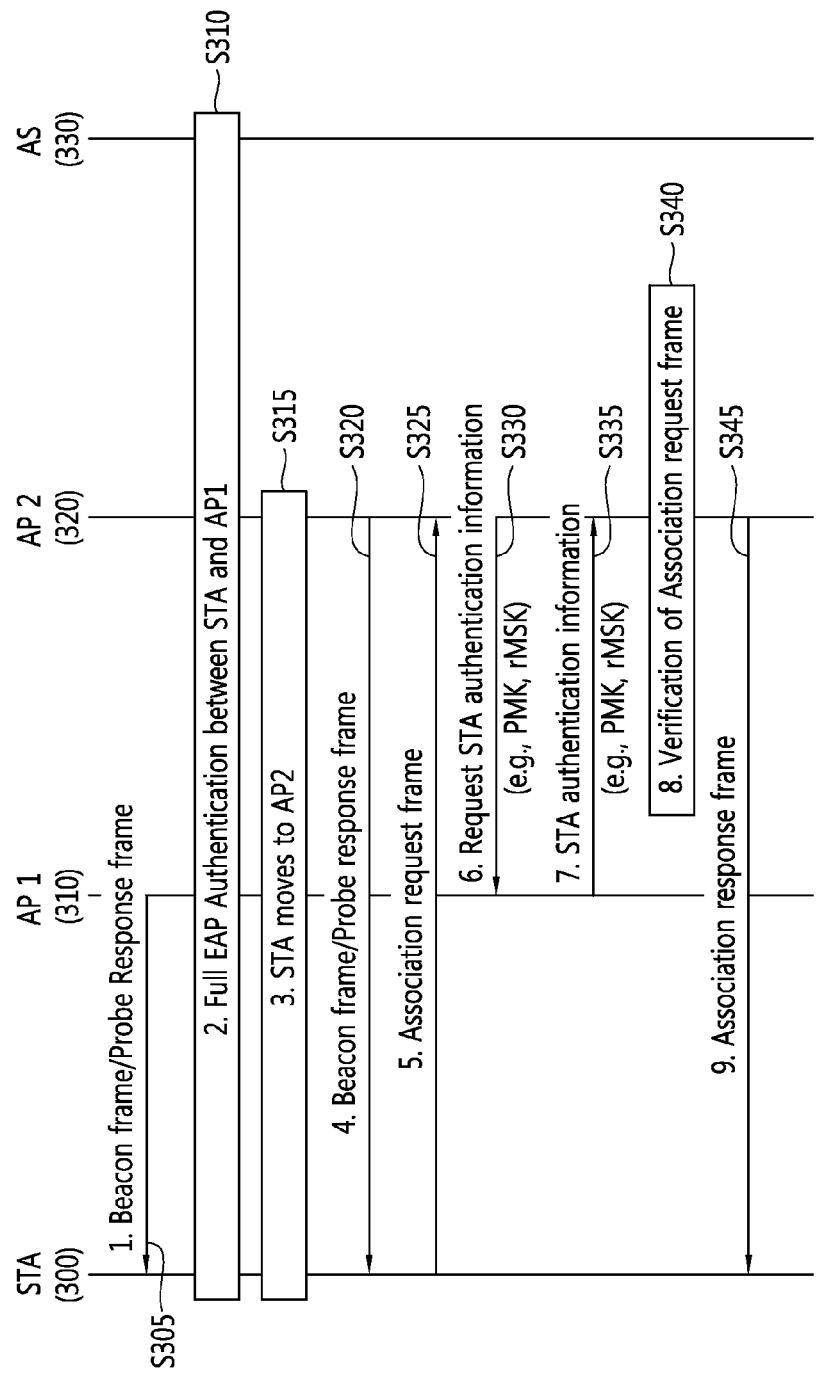
FIG. 3 is a conceptual diagram illustrating a method of performing, by APs and an STA, a simplified authentication procedure in accordance with an embodiment of the present invention.

FIG. 3 is a conceptual diagram illustrating a method of performing, by APs and an STA, a fast association in accordance with an embodiment of the present invention.

FIG. 3 discloses a case where an STA 300 releases an association with an AP1 310 with which the STA 300 is now associated and is associated with an AP2 320 by performing handover to the AP2 320.

In FIG. 3, the AP1 310 means an AP with which the STA 300 was previously associated. The AP2 320 means an AP with which the STA 300 performs an association after the STA 300 performs an association with the AP1 310. Each of BSSs implemented by the AP1 310 and the AP2 320 may be connected by a distribution system, thus being capable of forming an ESS network.

Referring to FIG. 3, the STA 300 may receive information about whether the authentication information of the STA 300 may be shared with the AP2 320 from the AP1 310 through a frame, such as a beacon frame/probe response frame (step S305).

The AP1 310 may send the beacon frame or probe response frame, including information about whether the AP1 310 shares the authentication information with the AP2 320, to the STA 300. The information about whether the authentication information included in the beacon frame/probe response frame is shared may be an indication field regarding whether the authentication information (e.g., Paired Main Keys (PMKs)/recertification Main Session Keys (rMSKs)) related to the STA 300 between the AP1 310 and the AP2 320 may be shared.

The AP1 310 may notify the STA 300 whether the AP1 310 is able to share the authentication information with the AP2 320 based on such an authentication information sharing indication field that is included in the beacon frame/probe response frame.

The authentication information sharing indication field is information indicative that the AP1 310 and the AP2 320 may now share the authentication information. If the authentication information is shared between the APs, when the STA 300 subsequently performs handover from the AP1 310 with which the STA 300 is now associated to the AP2 320, that is, another surrounding AP, the STA 300 can be rapidly associated with the AP2 320 by performing a simplified authentication procedure with the AP2 320 without a need to performing a full EAP.

That is, the STA 300 may perform an association with the AP2 320 in accordance with a simplified authentication procedure because the STA 300 is aware that it can perform the simplified authentication procedure based on the authentication information sharing indication field when performing the association with the AP2 320.

The PMK is authentication information used when an Extensible Authentication Protocol (EAP) method is performed, and may be derived from an Authentication, Authorization, and Accounting (AAA) key, that is, authentication information between the STA 300 and an Authentication Server (AS) 330. The rMSK is authentication information derived from the AAA key, and may have the same value as the AAA key.

The PMK and/or the rMSK are examples of authentication information for performing an authentication procedure, and another piece of authentication information may be shared between AP1 310 and AP2 320. Such an embodiment is also included in the scope of the present invention.

In accordance with an embodiment of the present invention, information indicating whether authentication information, such as a PMK and/or an rMSK, may be shared between the AP1 310 and the AP2 320 may be included in a frame, such as a beacon frame and a probe response frame, and transmitted.

Figure 4:
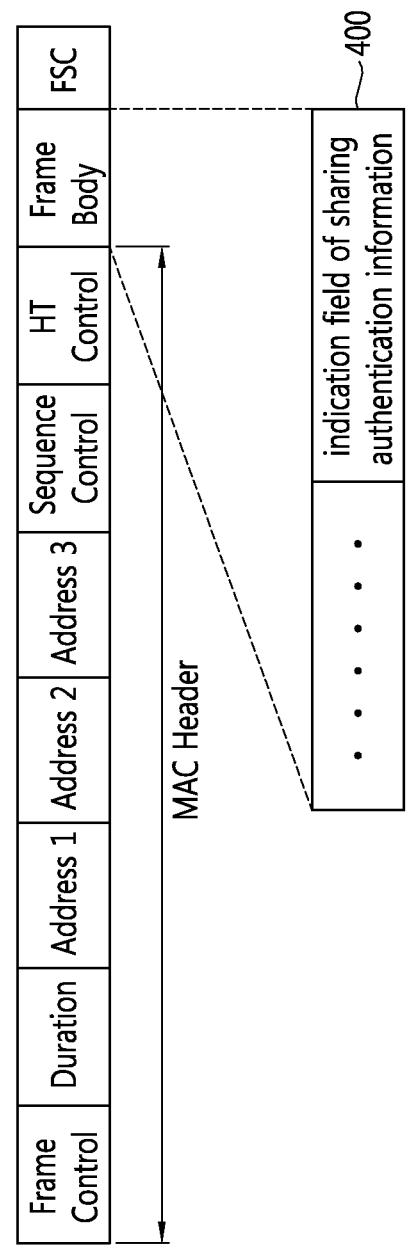
FIG. 4 is a conceptual diagram illustrating a beacon frame and a probe response frame including an authentication information sharing indication field in accordance with an embodiment of the present invention.

FIG. 4 is a conceptual diagram illustrating a beacon frame and a probe response frame including an authentication information sharing indication field in accordance with an embodiment of the present invention.

Referring to FIG. 4, the authentication information sharing indication field 400 may be included in the frame body of the beacon frame and the probe response frame. A STA that has received a beacon frame or a probe response frame may be aware of information about whether APs adjacent to an AP that now performs access or that is now connected mutually share authentication information (e.g., a PMK and/or an rMSK) based on the authentication information sharing indication field 400.

Referring back to FIG. 3, the STA 300 performs a full EAP authentication process from the AS 330 before the STA 300 is associated with the AP1 310 (step S310).

At step S310, the STA 300 and the AP1 310 may perform an authentication process by performing a full EAP procedure.

The STA 300 whose authentication has been completed may access the AP1 310 and receive service. Thereafter, the STA 300 may terminate the association with the AP1 310 and perform an association with the AP2 320 (step S315).

For example, if the STA 300 moves from the transmission range of the AP1 310 to the transmission rang of the AP2 320, the STA 300 may terminate an association with the AP1 310 and perform an association with the AP2 320.

The STA 300 obtains an ANonce value from the AP2 320 through a beacon frame or a probe response frame (step S320).

An Authenticator Number used only once-in-a-lifetime (ANonce) is a random number value generated by the AP1 310. Thereafter, the STA 300 may use the ANonce along with a Supplicant Number used only once-in-a-lifetime (SNonce), that is, a random number value generated by the STA 300, in order to generate an Extensible Authentication Protocol transport Over LAN (EAPOL)-key.

The STA 300 provided with information, indicative that the AP1 310 and the AP2 320 can share authentication information (e.g., a PMK/rMSK), through the beacon frame or the probe response frame at step S305 sends an association request frame to the AP2 320 in order to perform an association with the AP2 320 (step S325).

In an association method between an AP and an STA in accordance with an embodiment of the present invention, if the STA 300 performs handover to the AP1 310, that is, a previously associated AP, and the AP2 320, that is, an AP with which the STA 300 is able to share authentication information, the STA 300 may perform a simplified authentication procedure based on information for performing an authentication procedure that is included in the association request frame and the authentication information received from the AP2 320 without performing a full authentication procedure.

Information that is used for an AP to perform authentication, such as the identifier of a previously associated AP (e.g., the MAC address (BSSID) of the AP1 310), an EAPOL-Key (an SNonce, an ANonce), and Message Integrity Code (MIC), may be included in the association request frame and then transmitted to the AP2 320. The EAPOL-Key included in the association request frame is information that is generated based on the ANonce, that is, a random number value generated by the AP2 320, and the SNonce, that is, a random number value generated by the STA 300, and that is related to authentication. The MIC is code having some bits, and is code for authenticating the integrity of a message. A payload included in the association request frame may be protected by an EAPOL-Key Confirmation Key (KCK).

Figure 5:
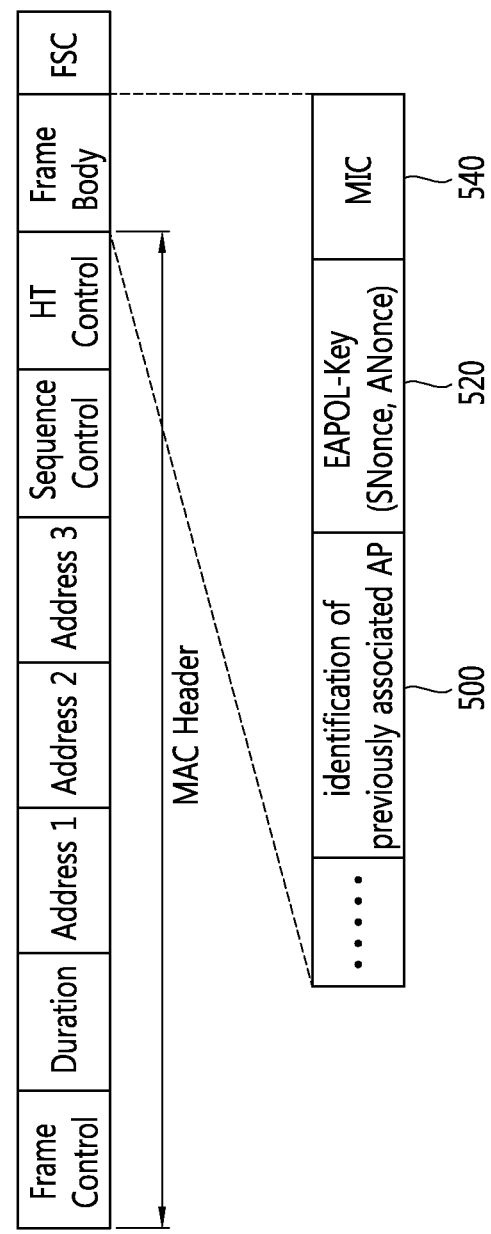
FIG. 5 is a conceptual diagram illustrating an association request frame in accordance with an embodiment of the present invention.

FIG. 5 is a conceptual diagram illustrating an association request frame in accordance with an embodiment of the present invention.

Referring to FIG. 5, information for performing an authentication procedure, such as the identifier of a previously associated AP (e.g., the MAC address (BSSID) 500 of the AP1 310), an EAPOL-Key (an SNonce, an ANonce) 520, and Message Integrity Code (MIC) 540, may be included in the payload of the association request frame.

The AP2 320 requests the AP1 310 to transfer the authentication information of the STA 300 (step S330).

The AP1 310 sends the authentication information of the STA 300 to the AP2 320 (step S335).

When the AP2 320 requests the authentication information of the STA 300 from the AP1 310, the AP1 310 that has owned the authentication information of the STA 300 may send the authentication information, such as a PMK and/or an rMSK, to the AP2 320.

The AP2 320 that has received the authentication information, such as a PMK and/or an rMSK, from the AP1 310 generates security keys, such as a Pairwise Transient Key (PTK), a Key Confirmation Key (KCK), and a Key Encryption Key (KEK), based on the ANonce and the SNonce received through step S325, and performs STA authentication by verifying the MIC included in the association request frame (step S340).

The PTK is a value calculated using a pseudo random function based on the PMK, the MAC addresses of the AP and the STA, the ANonce, and the SNonce. The calculated PTK may be generated as a KCK, a KEK, and a TK again and used in an authentication procedure.

That is, in a simplified authentication method between the AP2 320 and the STA 300 in accordance with an embodiment of the present invention, an authentication procedure performed in accordance with the existing 4-way handshake method between an STA and an AP can be performed through a simple procedure, such as that described above, wherein when the association request frame of an STA is transmitted, authentication information is included in the association request frame and transmitted and authentication information between APs is shared.

If the AP2 320 fails in verifying the association request message, the AP2 320 may not send an association response frame (or may silently discard the association response frame) or may notify the STA 300 that the verification of the association request message has failed through the association response frame, and may instruct the STA 300 to perform a full authentication and security procedure (full EAP) not a simplified authentication procedure.

If the AP2 320 successfully verifies the message of the association request frame, the AP2 320 may send an association response frame, encrypted/integrity-protected with the generated KEK/KCK, to the STA 300 (step S345).

The association response frame transmitted by the AP2 320 may include an EAPOL-key at which a PTK, a GTK, and an IGTK have been installed.

The STA 300 that has received the association response frame performs a key agreement process between the STA 300 and the AP2 320 through message verification using a security key. If the STA 300 that has received the association response frame successfully performs decryption/message verification, the STA 300 may access the AP2 320 and receive normal service. If the STA 300 does not perform decryption/message verification, the STA 300 may perform a full EAP procedure with the AS 330 again.

Figure 6:
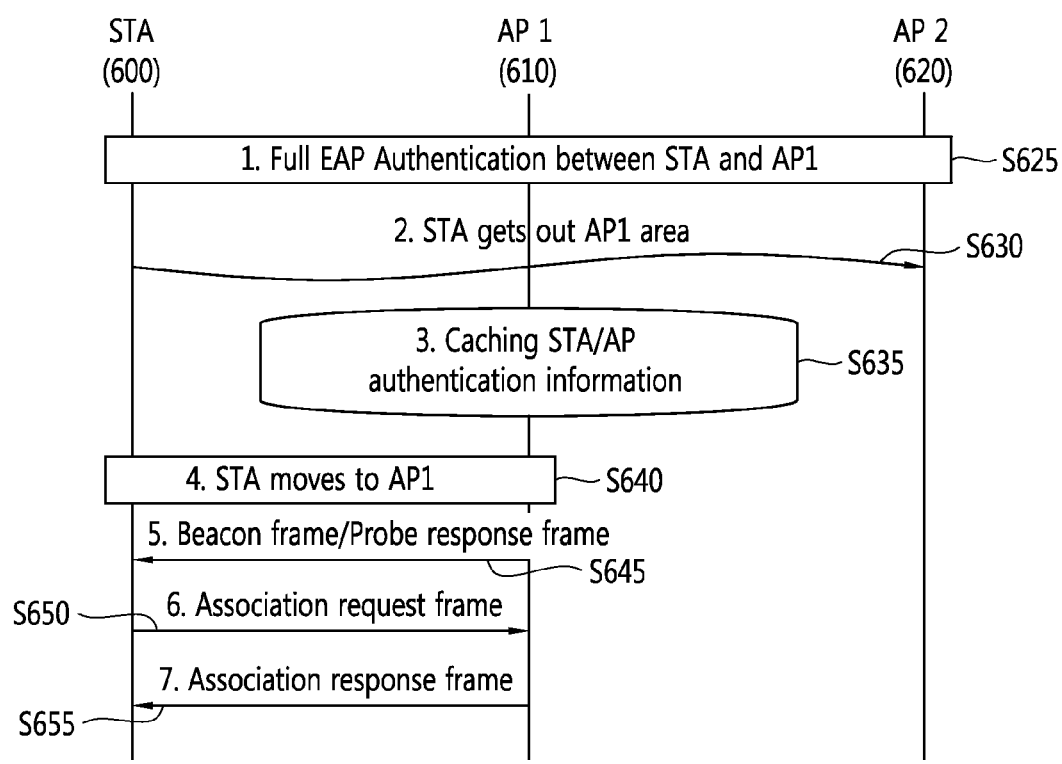
FIG. 6 is a conceptual diagram illustrating a method of performing, by APs and an STA, a simplified authentication procedure in accordance with an embodiment of the present invention.

FIG. 6 is a conceptual diagram illustrating a method of performing, by APs and an STA, a simplified authentication procedure in accordance with an embodiment of the present invention.

FIG. 6 discloses a case where an STA 600 performs a reassociation with an AP1 610 with which the STA 600 was previously associated.

In FIG. 6, the AP1 610 is an AP with which the STA 300 was previously associated, and an AP2 620 is an AP with which the STA 600 performs association before the STA 600 performs a reassociation with the AP1 610. Like in FIG. 3, BSSs implemented by the AP1 610 and the AP2 620 may be connected by a distribution system, thus being capable of forming an ESS network.

Referring to FIG. 6, the STA 600 may perform authentication through a full EAP procedure before performing an association with the AP1 610 (step S625).

The STA 600 releases the association with the AP1 610 (step S630).

It may be assumed that the STA 600 deviates from the coverage of the AP1 610 and moves to the coverage of another AP (e.g., the AP2 620). In such a case, the AP1 610 may receive a disassociation or de-authentication message from the STA 600.

The AP1 610 may retain the authentication information (e.g., a PMK, an rMSK) of the STA 600, obtained through authentication and an EAP procedure with the STA 600, until an authentication information retain timer expires (step S635). For example, a PMK retain timer and an rMSK retain timer may be set to specific values, and the AP1 610 may retain information about a PMK and/or an rMSK until the PMK retain timer and an rMSK retain timer expire.

The STA 600 moves to the transmission range of the AP1 610 with which the STA 600 was previously associated (step S640).

If the STA 600 moves to the transmission range of the AP1 610, it may obtain an ANonce value from the AP1 610 through a beacon frame or a probe response frame (step S645).

The STA 600 sends an association request frame in order to be associated with the AP1 610 again (step S650).

The association request frame may include information, such as the ID (e.g., an Association IDentification (AID) or a MAC address) of the STA 600, MIC, and an EAPOL-Key (an SNonce, an ANonce).

Figure 7:
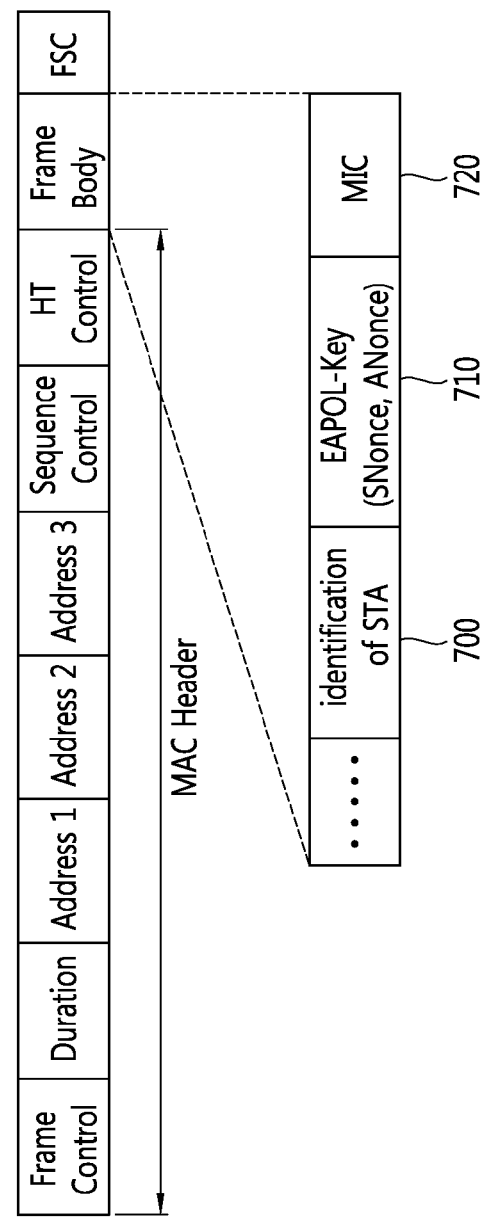
FIG. 7 is a conceptual diagram illustrating an association request frame in accordance with an embodiment of the present invention.

FIG. 7 is a conceptual diagram illustrating an association request frame in accordance with an embodiment of the present invention.

Referring to FIG. 7, authentication information, such as the ID 700 of a previously associated STA (e.g., the Association IDentification (AID) or MAC address of the STA), an EAPOL-key (an SNonce, an ANonce) 710, and MIC 720, may be included in the payload of the association request frame. The payload of the association request frame including such information may be protected by a Key Confirmation Key (KCK).

The AP1 610 may recognize that the STA 600 is the STA 600 with which the AP1 610 was previously associated by checking the identifier of the STA 610 based on the received association request frame. The AP1 610 may perform message verification on the association request frame using the authentication information (e.g., a PMK and an rMSK) of the STA 600 that is retained in the AP1 610.

For example, if the STA 600 and the AP1 610 generates an rMSK by performing an EAP-RP and uses the generated rMSK as authentication information, the AP1 610 may retain the rMSK until the time set in an rMSK retain timer expires. Furthermore, even in the case of a PMK, the AP1 610 may retain the PMK until the time set in a PMK retain timer expires.

If the time that the authentication information (e.g., a PMK and an rMSK) of the STA 600 has to be retained in the AP1 610 expires or the AP1 610 fails in verifying the association request frame of the STA 600, the AP1 610 may not send an association response frame to the STA 600, or the AP1 610 may notify the STA 600 that the time that the authentication information (e.g., a PMK and an rMSK) of the STA 600 has to be retained in an authentication information retain timer has expired through the association response frame and may instruct the STA 600 to perform full EAP authentication.

If the AP1 610 successfully performs the frame verification of the association request frame, the AP1 610 transfers the association response frame, encrypted/integrity-protected with a KEK/KCK, to the STA 600. The STA 600 that has received the association response frame may perform a key agreement process between the STA 600 and the AP1 610 through frame verification using its own security key.

Since the authentication information (e.g., a PMK and an rMSK) between the STA 600 and the AP 610 is retained by the STA 600 and the AP1 610, a simplified authentication procedure can be performed by omitting an EAP procedure between an AS and the STA 600 based on the authentication information.

If the STA 600 that has received the association response frame successfully decryption/message verification, the STA 600 may access the AP1 610 and receive normal service. If the STA 600 fails in performing decryption/message verification, the STA 600 may perform a full EAP authentication process from an AS.

Figure 8:
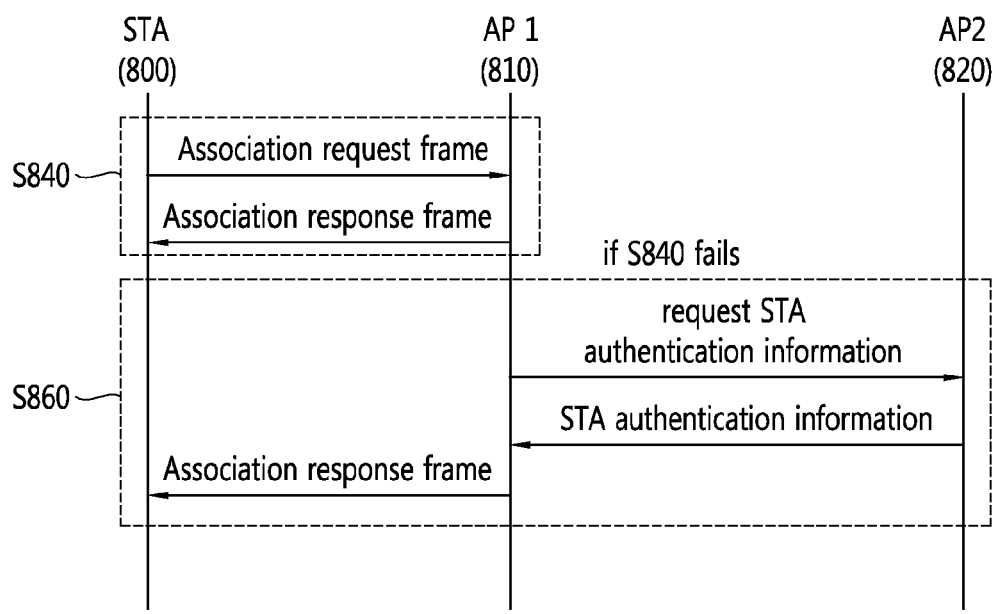
FIG. 8 is a conceptual diagram illustrating a method of performing, by APs and an STA, a simplified authentication procedure in accordance with an embodiment of the present invention.

FIG. 8 is a conceptual diagram illustrating a method of performing, by APs and an STA, a simplified authentication procedure in accordance with an embodiment of the present invention.

FIG. 8 discloses a case where (1) a method of determining, by an AP1 810, a previous access record with an STA 800 and performing an association and (2) a method of sharing the authentication information of the STA 800 between an AP2 820, that is, an AP with which the STA was previously associated, and the AP1 810 are combined and performed when the AP1 810 and the STA 800 perform an association.

Referring to FIG. 8, first, the AP1 810 and the STA 800 may perform an association by determining the previous access record of the STA 800 (step S840).

When the STA 800 accesses the AP1 810, the STA 800 may determine whether there is an access record with the AP1 810.

If the authentication information of the STA 800 is retained in the AP1 810, the STA 800 may perform a fast association with the AP1 810 through a simplified authentication procedure based on the corresponding information as described above with reference to FIG. 6.

An association between the AP1 810 and the STA 800 may be performed by performing a method of sharing the authentication information of the STA 800 between the AP2 820 and the AP1 810 (step S860).

If, as a result of the execution of step S840, the authentication information of the STA 800 is not retained in the AP1 810, whether or not the AP2 820 and the AP1 810 are able to share the authentication information of the STA 800 may be determined If the AP2 820 and the AP1 810 are determined to be able to share the authentication information of the STA 800, the AP1 810 may request the authentication information of the STA 800 from the AP1 820 as in the procedure of FIG. 3. As another method, the two procedures may be reversely combined and performed.

Figure 9:
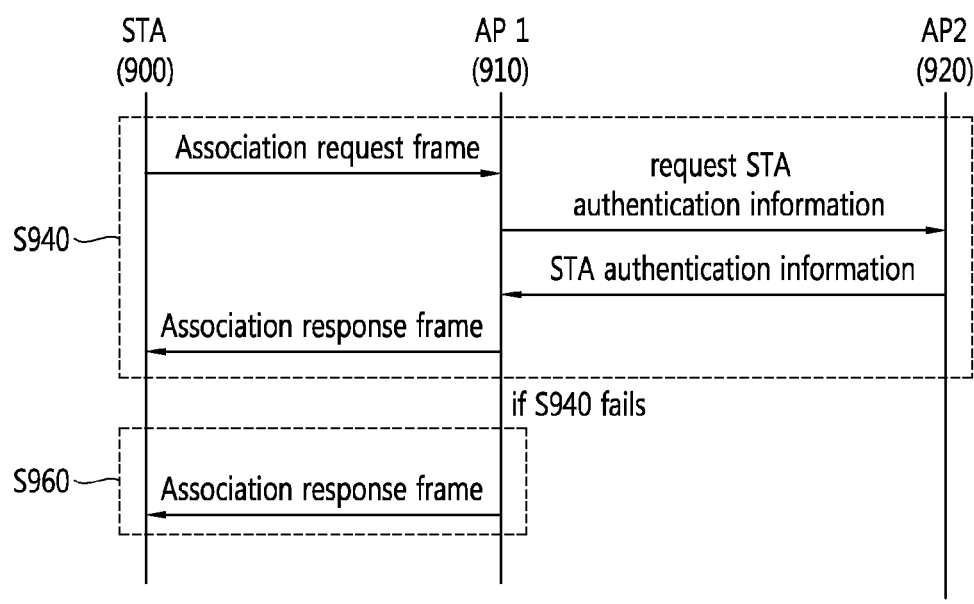
FIG. 9 is a conceptual diagram illustrating a method of performing, by APs and an STA, a simplified authentication procedure in accordance with an embodiment of the present invention.

FIG. 9 is a conceptual diagram illustrating a method of performing, by APs and an STA, a simplified authentication procedure in accordance with an embodiment of the present invention.

FIG. 9 discloses a case where the procedures of the two steps S840 and S860 disclosed in FIG. 8 are changed in order and performed.

First, an association between an AP1 910 and an STA 900 may be performed by performing a method of sharing the authentication information of the STA 900 between the AP1 910 and an AP2 920, that is, an AP previously associated with the STA 900 (step S940).

If the AP1 910 and the AP2 920, that is, an AP associated with the STA 900 before the STA 900 is associated with the AP1 910, are able to share the authentication information of the STA 900, the AP1 910 may request the authentication information of the STA 900 from the AP2 920 as in the procedure of FIG. 3.

If the AP2 920 and the AP1 910 are unable to share the authentication information of the STA 900, whether or not an association record with the STA 900 remains in the AP1 910 may be determined. If the authentication information of the STA 900 is retained in the AP1 910, the STA 900 may rapidly perform an association with the AP1 910 through a simplified authentication procedure based on the authentication information as described above with reference to FIG. 6 (step S960).

That is, the procedures described with reference to FIGS. 3 and 6 may be individually performed or the two procedures may be combined and performed, and such embodiments are also included in the scope of the present invention.

Figure 10:
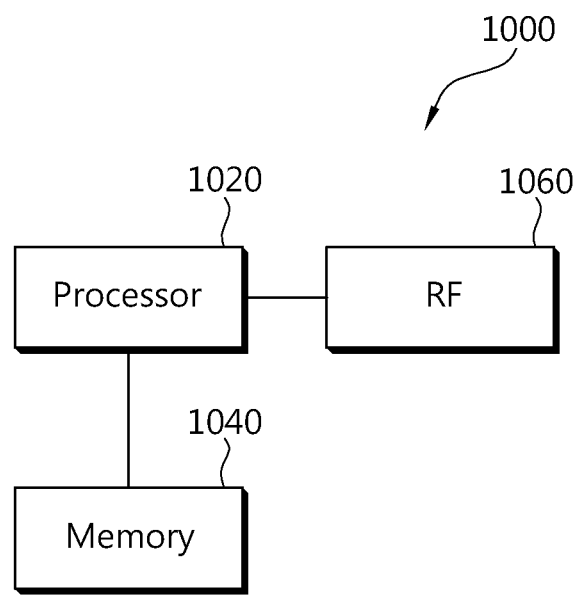
FIG. 10 is a block diagram illustrating a wireless apparatus to which an embodiment of the present invention may be applied.

FIG. 10 is a block diagram illustrating a wireless apparatus to which an embodiment of the present invention may be applied.

The wireless apparatus 1000 is an STA capable of implementing the aforementioned embodiments, and may be an AP or a non-AP STA.

The wireless apparatus 1000 includes a processor 1020, memory 1040, and a Radio Frequency (RF) unit 1060.

The RF unit 1060 is connected to the processor 1020, and may transmit/receive radio signals.

The processor 110 implements the functions processes and/or methods proposed by the present invention. For example, the processor 1020 may be implemented to perform the simplified authentication procedure in accordance with an embodiment of the present invention. The processor 1020 may be implemented to request the authentication information of an STA from an AP, previously associated with the STA, based on an association request frame received from the STA and to receive the authentication information of the STA from the previously associated AP. Furthermore, the processor 1020 may determine whether or not the STA is a previously associated STA based on the identifier of the STA included in the received association request frame. If the STA is determined to be the previously associated STA, the processor 1020 may perform verification on the association request frame based on the retained authentication information of the STA. That is, the processor 1020 may be implemented to perform the aforementioned embodiments of the present invention.

The processor 1020 may include Application-Specific Integrated Circuits (ASICs), other chipsets, logic circuits, data processors and/or converters for mutually converting baseband signals and radio signals. The memory 1040 may include Read-Only Memory (ROM), Random Access Memory (RAM), flash memory, a memory card, a storage medium and/or other storage devices. The RF unit 1060 may include one or more antennas for sending and/or receiving radio signals.

When an embodiment is implemented in software, the aforementioned scheme may be implemented as a module (a process, a function, etc.) for performing the aforementioned functions. The module may be stored in the memory 1040, and may be executed by the processor 1020. The memory 1040 may be inside or outside the processor 1020, and may be connected to the processor 1020 by various well-known means.

What is claimed is:

1. A method of performing, by a station (STA), an association in a wireless local area network (WLAN) comprising a first Access Point (AP), a second AP, and a distribution system connecting the first and second APs, the method comprising:

receiving, from the first AP, a scanning frame including a sharing indicator indicating whether the first AP shares a Paired Main Key (PMK) and a recertification Main Session Key (rMSK) with a neighbor AP, wherein the scanning frame is a beacon frame or a probe response frame;

transmitting an association request frame to the second AP;

wherein the association request frame includes an address of the first AP, an Extensible Authentication Protocol transport Over Local area network (EAPOL)-key, and Message Integrity Code (MIC), wherein the EAPOL-key is an authentication key generated based on an Authenticator Number used only once-in-a-lifetime (ANonce) received from the first AP and a Supplicant Number used only once-in-a-lifetime (SNonce) generated by the STA, and wherein the MIC is a code for an integrity authentication of a message; and receiving an association request frame from the second AP, wherein, if the sharing indicator indicates the first AP shares the PMK and the rMSK, the STA does not include the PMK and the rMSK in the association request frame.

2. A station (STA), an association in a wireless local area network (WLAN) comprising a first access point (AP) a second AP, and a distribution system connecting the first and second APs, the STA comprising:

a receiver; and a processor configured to:

receiving, from the first AP, a scanning frame including a sharing indicator indicating whether the first AP shares a Paired Main Key (PMK) and a recertification Main Session Key (rMSK) with a neighbor AP, wherein the scanning frame is a beacon frame or a probe response frame;

transmit an association request frame to the second AP, wherein the association request frame includes an address of the first AP, an Extensible Authentication Protocol transport Over Local area network (EAPOL)-key, and Message Integrity Code (MIC), wherein the EAPOL-key is an authentication key generated based on an Authenticator Number used only once-in-a-lifetime (ANonce) received from the first AP and a Supplicant Number used only once-in-a-lifetime (SNonce) generated by the STA, and wherein the MIC is a code for an integrity authentication of a message; and receive an association request frame from the second AP, wherein, if the sharing indicator indicates the first AP shares the PMK and the rMSK, the STA does not include the PMK and the rMSK in the association request frame.

3. The method of claim 1, wherein, if the PMK and the rMSK are not included in the association request frame the second AP fetches the PMK and the rMSK from the first AP.

4. The station of claim 2, wherein, if the PMK and the rMSK are not included in the association request frame the second AP fetches the PMK and the rMSK from the first AP.

* * * * *